(12) United States Patent
Belchee et al.

(10) Patent No.: US 9,059,949 B2
(45) Date of Patent: Jun. 16, 2015

(54) MONITORING OF REGULATED ASSOCIATES

(75) Inventors: William Blake Belchee, Charlotte, NC (US); Julie M. Ingalls, Newark, DE (US); Richard A. McEntee, Charlotte, NC (US); Kanaka Subramaniam Kunjithapatham, Chennai (IN); Jogeswar Sarma Malapaka, Hyderabad (IN); Glenn A. Ford, Wilmington, DE (US); Thomas M. Jackson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 229 days.

(21) Appl. No.: 13/216,218

(22) Filed: Aug. 23, 2011

(65) Prior Publication Data
US 2013/0054702 A1 Feb. 28, 2013

(51) Int. Cl.
*G06F 15/16* (2006.01)
*H04L 12/58* (2006.01)
*G06F 21/10* (2013.01)
*G06Q 10/10* (2012.01)

(52) U.S. Cl.
CPC ............. *H04L 51/12* (2013.01); *H04L 51/20* (2013.01); *G06Q 10/107* (2013.01); *H04L 12/585* (2013.01); *G06F 21/10* (2013.01)

(58) Field of Classification Search
CPC .......... H04L 51/12; H04L 51/20; G06F 21/10
USPC ........................................................ 709/206
See application file for complete search history.

(56) References Cited

U.S. PATENT DOCUMENTS

| | | | |
|---|---|---|---|
| 8,131,808 B2 * | 3/2012 | Aoki et al. | 709/206 |
| 8,321,949 B1 * | 11/2012 | Green et al. | 726/26 |
| 8,611,928 B1 * | 12/2013 | Bill | 455/456.3 |
| 2008/0133972 A1 * | 6/2008 | Verbowski et al. | 714/37 |
| 2011/0077022 A1 * | 3/2011 | Scovill | 455/456.1 |
| 2012/0005291 A1 * | 1/2012 | True et al. | 709/206 |
| 2012/0227105 A1 * | 9/2012 | Friedrichs et al. | 726/22 |
| 2012/0291102 A1 * | 11/2012 | Cohen | 726/4 |

* cited by examiner

*Primary Examiner* — Hee Soo Kim
(74) *Attorney, Agent, or Firm* — Banner & Witcoff, Ltd.; Michael A. Springs

(57) ABSTRACT

Methods, computer readable media, and apparatuses for monitoring regulated associates are presented. According to one or more aspects, a user command to send an electronic message using a mobile computing device may be detected. Subsequently, content of the electronic message may be analyzed to determine whether the message violates one or more policies. In response to determining that the message violates one or more policies, the message may be added to a listing of flagged messages. According to one or more additional aspects, at least one occurrence of an application installation event may be detected on a computing device. In response to detecting the at least one occurrence of the application installation event, an application corresponding to the at least one occurrence of the application installation event may be identified. Subsequently, it may be determined whether the identified application is approved for use on the computing device.

19 Claims, 6 Drawing Sheets

| Allowed Applications List | |
|---|---|
| Name | Version |
| Application AAA | 1.0 |
| Application BBB | 2.4 and below |
| Application CCC | 3.1.1 and below |

MONITORING OF REGULATED ASSOCIATES

TECHNICAL FIELD

One or more aspects of the disclosure generally relate to computing devices, computing systems, and computer software. In particular, one or more aspects of the disclosure generally relate to computing devices, computing systems, and computer software that may be used by an organization, such as a financial institution, or other entity in monitoring communications and/or managing one or more mobile devices.

BACKGROUND

Increasingly, large organizations, such as financial institutions, provide employees and other affiliates with mobile computing devices, such as smartphones, to allow personnel to be more connected and productive. The communications of certain personnel may be subject to legal, regulatory, and/or internal restrictions, however. In addition, such mobile computing devices may present a security risk to other computing devices and/or networks operated by such an organization. Aspects of the disclosure provide more convenient, functional, and effective ways of monitoring communications and managing software installed on mobile computing devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure relate to methods, computer-readable media, and apparatuses for monitoring regulated associates. For example, an organization, such as a financial institution, may provide many, if not all, of its employees, contractors, and so on, with mobile computing devices, such as smartphones, tablet computers, other mobile communication devices, and the like. While such mobile computing devices may allow associates of the organization to be more productive and connected to their work, these devices also may present both a compliance risk and/or a security risk to the organization. For instance, the organization (e.g., the financial institution) may be required, under applicable laws and regulations, to monitor and/or log communications to and/or from certain associates, such as those associates who deal with publicly traded securities and/or other financial instruments. Additionally or alternatively, the organization may wish to control which applications associates are able to install and/or execute on the mobile computing devices provided to them by the organization, as this may, for instance, allow the organization to maintain the integrity and security of its networks, among other things.

By implementing one or more aspects of the disclosure, an organization, such as a financial institution, may be able to monitor communications of associates, as may be required by applicable laws and regulations, and/or such an organization may be able to control what software is installed on mobile computing devices provided to associates of the organization. In particular, rather than forcing an organization to control messaging and/or application installations on mobile devices by nondescriptly logging all messages and/or entirely blocking application installation on such mobile devices, aspects of the disclosure enable such an organization to define with specificity, for instance, which messages should be logged (and which should not) and/or which applications may be installed (and which might not be allowed to be installed). Moreover, aspects of the disclosure allow for messages to be logged and application installations to be monitored on the client-side (e.g., by a mobile device itself) rather than on the server-side (e.g., by a remote device administration server).

According to one or more aspects, a user command to send an electronic message using a mobile computing device may be detected. Subsequently, content of the electronic message may be analyzed to determine whether the message violates one or more policies. In response to determining that the message violates one or more policies, the message may be added to a listing of flagged messages.

In one or more arrangements, the electronic message may be a text message or an email message. In at least one arrangement, analyzing content of the electronic message may include comparing the content of the electronic message with a blacklist to determine whether the electronic message includes any words, phrases, or patterns included in the blacklist. In at least one additional or alternative arrangement, adding the message to a listing of flagged messages may include recording a message body of the electronic message, an intended recipient of the electronic message, or a timestamp of the electronic message.

In still one or more arrangements, the message may be prevented from being sent and/or a notification message may be sent to an administrative server if it is determined that the message violates one or more policies. In some arrangements, at least one policy of the one or more policies may restrict messages from being sent from at least one restricted location. In one or more additional arrangements, a current location of the mobile computing device may be determined, and it may be determined that the message violates one or more policies if the current location of the mobile computing device is the at least one restricted location.

According to one or more additional aspects, at least one occurrence of an application installation event may be detected on a computing device. In response to detecting the at least one occurrence of the application installation event, an application corresponding to the at least one occurrence of the application installation event may be identified. Subsequently, it may be determined whether the identified application is approved for use on the computing device. In some arrangements, the identified application may be deleted if it is determined that the identified application is not approved for use on the computing device.

In one or more arrangements, determining whether the identified application is approved for use on the at least one computing device may include gathering information about the identified application, and comparing the gathered information to data associated with one or more approved applications. In at least one arrangement, the data associated with the one or more approved applications may include one or more application titles, one or more vendor names, one or more application release dates, and/or one or more version numbers. In at least one additional or alternative arrangement, the data associated with the one or more approved applications may be locally stored on the at least one computing device. Additionally or alternatively, the locally stored data may be periodically updated to match remotely stored data on an administrative server.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1A:
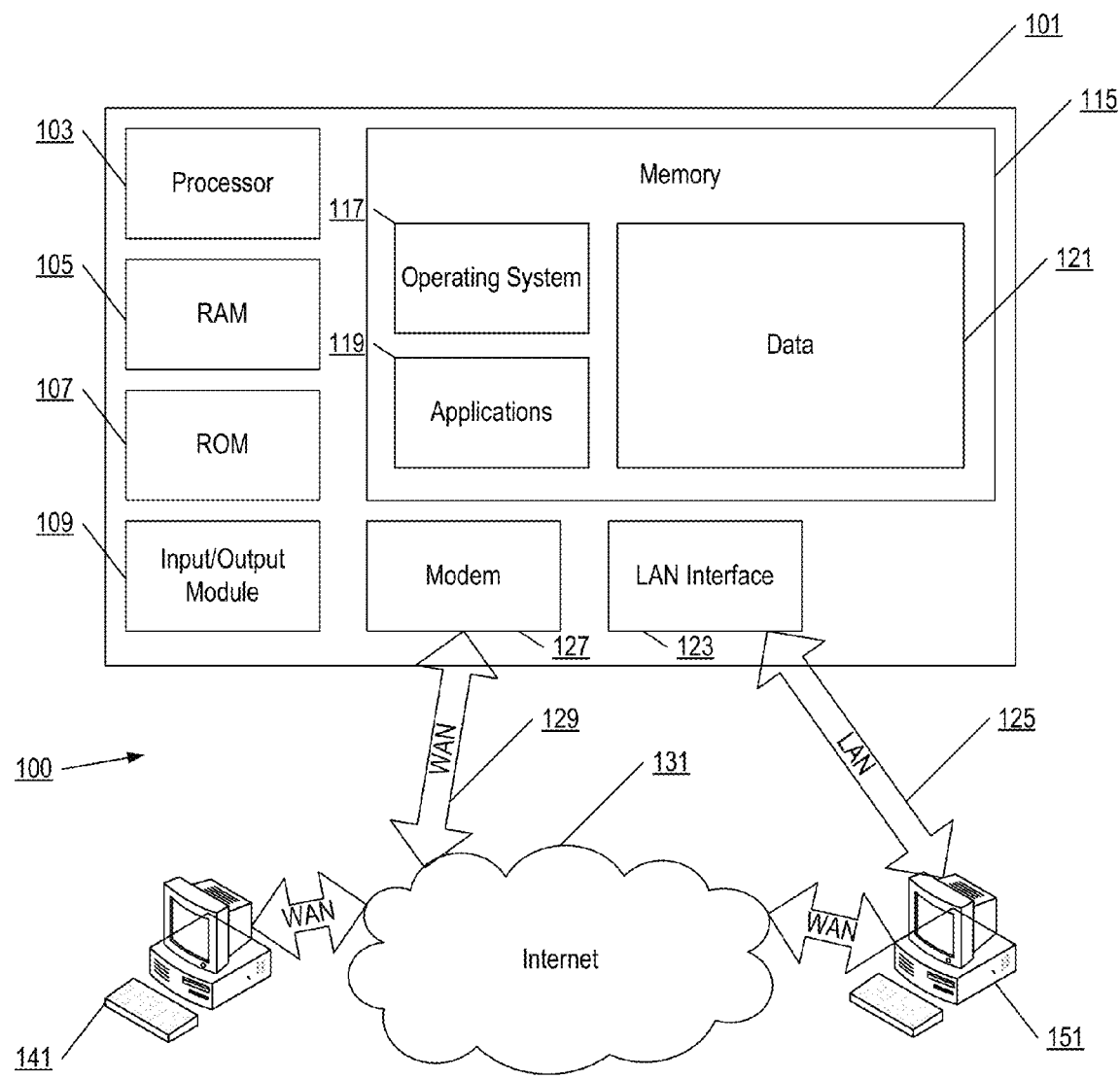
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and the like) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
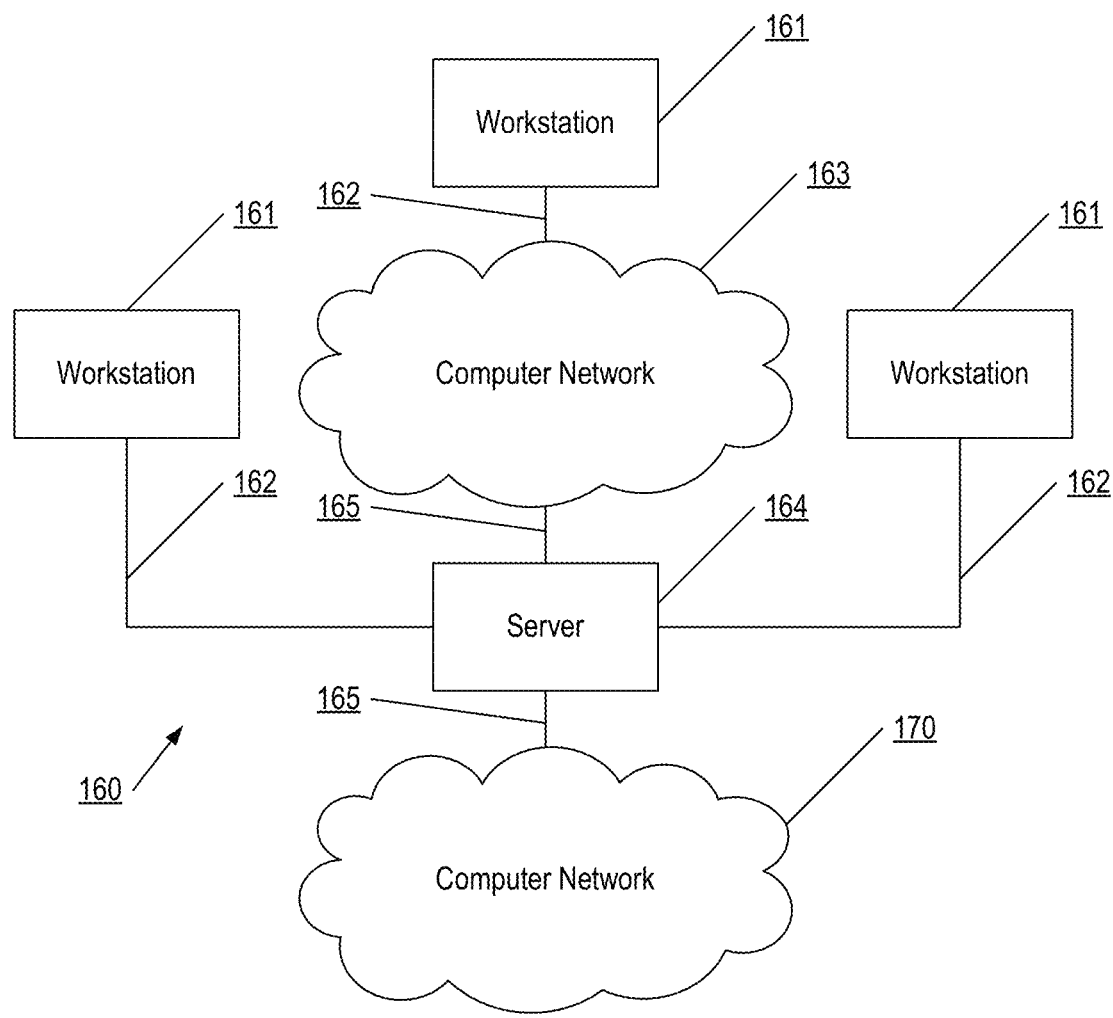
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and the like.

Figure 2:
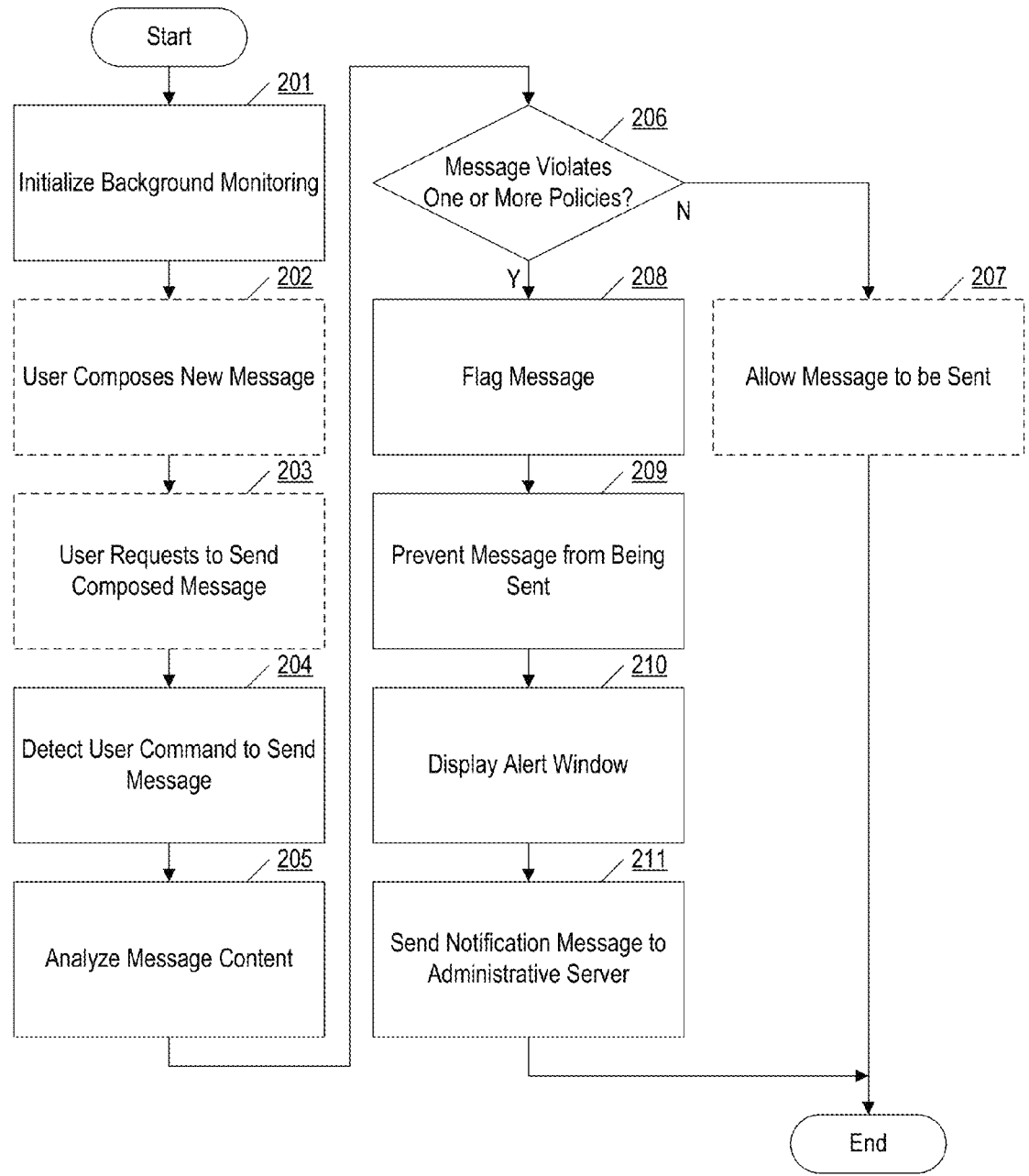
FIG. 2 illustrates an example method of monitoring communications according to one or more illustrative aspects described herein.

FIG. 2 illustrates an example method of monitoring communications according to one or more illustrative aspects described herein. According to one or more aspects, any and/or all of the methods described herein may be implemented by software executed on one or more computers, such as the generic computing device 101 of FIG. 1A, and/or by a computing system, such as system 160 of FIG. 1B. In some arrangements, the methods described herein may be performed by and/or in combination with a server (e.g., server 164). Additionally or alternatively, the methods described herein may be performed by and/or in combination with one or more workstations (e.g., workstations 161). In at least one arrangement, any and/or all of the methods described herein may be performed by a mobile computing device, such as a smartphone or tablet computer.

In step 201, background monitoring may be initialized. For example, in step 201, a computing device (e.g., a mobile computing device, such as a smartphone, tablet computer, and the like) may initialize and/or otherwise execute one or more background monitoring processes. The one or more background monitoring processes may, for instance, form part of a communication monitoring software application, such as an application that may be deployed by an organization (e.g., a financial institution) to one or more computing devices (e.g., smartphones, tablet computers, and the like) which the organization provides to its employees, contractors, affiliates, and/or any other entities. In one or more arrangements, the background monitoring process may be executed on and/or by the mobile computing device to monitor communications and/or other events facilitated by and/or otherwise occurring on the mobile computing device. In at least one arrangement, the one or more background monitoring processes (e.g., of the communication monitoring software application) may monitor communications and/or other events occurring on the mobile computing device by listening to an event console provided by the operating system of the mobile computing device, where the event console may include real-time status updates from any and/or all of the one or more various software applications that may be running on the mobile computing device.

In step 202, a user of the computing device may compose a new message. For example, in step 202, a user of the mobile computing device may use a messaging application to compose a new electronic message (e.g., an electronic mail or "email" message, a text message, such as a Short Message Service (SMS) message or Multimedia Messaging Service (MMS) message, and the like) to one or more intended message recipients. The message may, for instance, include content such as one or more words, phrases, pictures, movies, sounds, and/or the like.

In step 203, the user of the computing device may request to send the composed message. For example, in step 203, the user of the mobile computing device may press a button or key on the mobile computing device (e.g., a SEND or ENTER key) corresponding to a request to send the composed message, and/or the user may select a button on a user interface displayed by the mobile computing device (e.g., by using a cursor, by providing touch-based user input, and the like) corresponding to a request to send the composed message.

In step 204, a user command to send the message may be detected. For example, in step 204, the mobile computing device (and/or the communication monitoring software application being executed thereon) may determine that the user has issued a command and/or otherwise requested that a message be sent by the mobile computing device. In one or more arrangements, the mobile computing device (and/or the communication monitoring software application being executed thereon) may make such a determination based on detecting, in the event console of the mobile computing device (e.g., as provided by the operating system of the mobile computing device), that a messaging application has received a request to send a message. In at least one arrangement, the mobile computing device (and/or the communication monitoring software application being executed thereon) may use one or more functions provided by an application programming interface (API) associated with the operating system of the mobile computing device to detect the occurrence of the user request/command.

In step 205, content of the message may be analyzed. For example, in step 205, the mobile computing device (and/or the communication monitoring software being executed thereon) may analyze the content of the message by parsing the text content to determine whether the message includes any words, phrases, or patterns (e.g., patterns of words, phrases, and/or characters) included on a blacklist, where the blacklist may represent a listing of words, phrases, and/or patterns that are deemed to violate one or more policies (e.g., internal policies set by the organization regarding message contents; laws and/or regulations imposed by government and/or a regulatory agency regarding message content, such as insider trading laws and securities regulations; and the like). In one or more arrangements, the content of the message may be parsed using one or more text search operations, regular expressions, and/or the like. In at least one arrangement, the mobile computing device (and/or the communication monitoring software being executed thereon) may, prior to analyzing the content of the message, use one or more functions provided by one or more APIs to request and/or otherwise obtain the content of the message (e.g., from the messaging application in which the message was composed).

According to one or more aspects, the blacklist may be stored locally on the mobile computing device (e.g., as a data table stored in memory of the mobile computing device). Additionally or alternatively, the blacklist may be updated regularly (e.g., according to a 1 predetermined schedule, such as daily, weekly, monthly, and the like) and/or when the mobile computing device is connected to one or more networks (e.g., the Internet) so as to match a remotely stored version of the blacklist, which may, for instance, be maintained by the organization on an administrative server.

Figures 3, 4, 5:
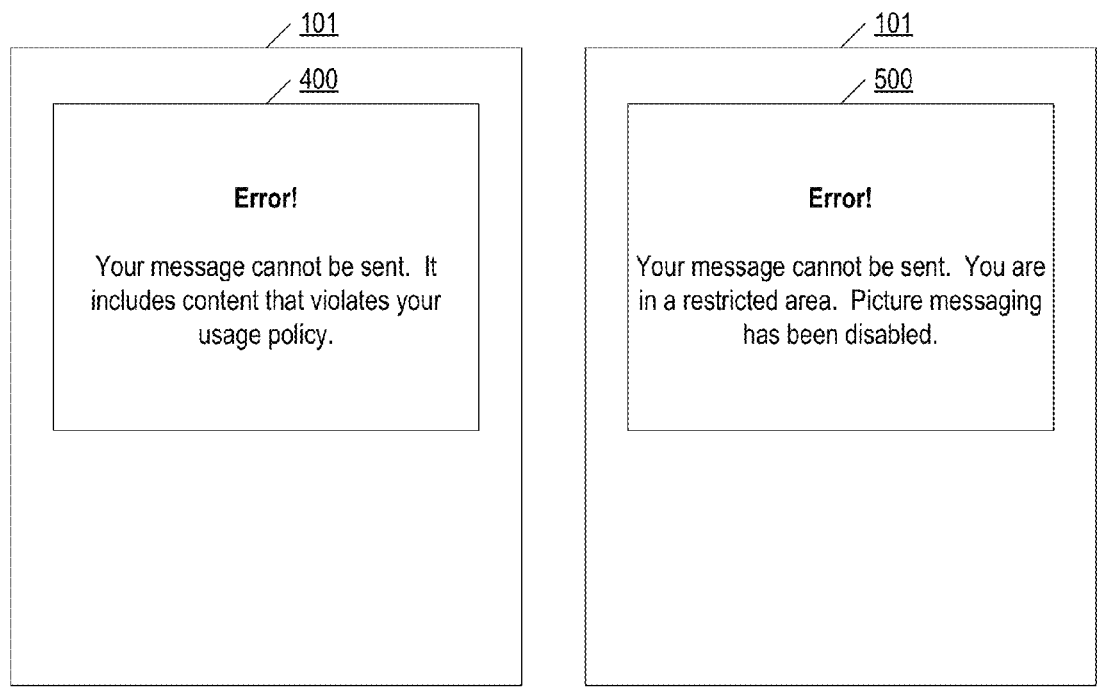
FIG. 3 illustrates an example listing of prohibited words, phrases, and patterns according to one or more illustrative aspects described herein.
FIGS. 4 and 5 illustrate example user interfaces that may be displayed in monitoring communications according to one or more illustrative aspects described herein.

FIG. 3 illustrates an example listing of prohibited words, phrases, and patterns according to one or more illustrative aspects described herein. As seen in example listing 300, a blacklist may include one or more words, such as the word "secret," and/or one or more phrases, such as the phrase "planned acquisition." Additionally or alternatively, a blacklist may include one or more patterns of characters, such as "XXXX-XXXX-XXXX-XXXX," where each X may represent a numerical character. An organization, such as a financial institution, may select words, phrases, and/or patterns to be included in the blacklist based, for instance, on the extent to which such words, phrases, and/or patterns may be indicative and/or otherwise characteristic of messages that would violate one or more policies, such as insider trading laws and/or other securities regulations. In the illustrated example, for instance, the word "secret" and the phrase "planned acquisition" may be included in the blacklist, as this word and/or phrase may often appear in messages that would violate one or more insider trading laws. In addition, the pattern "XXXX-XXXX-XXXX-XXXX" may be included in the blacklist, as this pattern of characters may suggest that the message includes a credit card number in violation of one or more privacy regulations and/or policies. While these words, phrases, and patterns are provided as examples, any other desired words, phrases, and/or patterns could be similarly included in the blacklist, and the scope of the disclosure is not limited to the words, phrases, and patterns illustrated in these examples.

Referring again to FIG. 2, in step 206, it may be determined whether the message violates one or more policies. For example, in step 206, the mobile computing device (and/or the communication monitoring software being executed thereon) may determine whether it was determined (e.g., in step 205) that the message includes any words, phrases, and/or patterns included in the blacklist. In one or more arrangements, if the message is determine to include any words, phrases, and/or patterns included in the blacklist, then it may be determined (e.g., by the mobile computing device) that the message violates one or more policies.

In one or more additional and/or alternative arrangements, a message may be determined to violate one or more policies (e.g., by the mobile computing device) based on geo-location information. For example, a policy may dictate that messages including one or more pictures (or any other content as may be desired) cannot be sent from certain geographic areas (e.g., as determined using a mobile computing device's built-in location hardware and/or software, such as global positioning system (GPS) functionalities provided by the hardware and/or software of the mobile computing device). In such an example where the user requests to send a message that includes one or more pictures using the mobile computing device (e.g., taken with a camera built into the mobile computing device), the mobile computing device may use such built-in GPS functionalities to acquire the current location of the device, and then determine whether one or more policies prohibit messages which include pictures (or any other content included in the message) from being sent from the device's current location. Thereafter, if the mobile computing device determines that it is currently located in a restricted location, for instance, the mobile computing device may determine that allowing the message to be sent would violate one or more policies (and accordingly prohibit sending the message, as further described below).

By creating one or more policies that restrict messages based on geo-location information, an organization, such as a financial institution, may be able to prevent picture messages (and/or any other desired type of messages, such as video messages, audio messages, or even text messages that include particular words, phrases, patterns, and the like) from being sent while the user is in an office location of the organization, for example, and/or in another location the organization might choose to designate and/or define as a restricted location (e.g., a location containing confidential information, having visible features that the organization might wish to maintain as secret or confidential, and the like). Possible examples of locations that an organization might define as restricted locations include offices, warehouses, courtrooms, construction sites, and laboratories. Additionally or alternatively, the mobile computing device (and/or the communication monitoring software being executed thereon) may be configured to regularly determine the device's location and disable particular functionalities (e.g., messaging functions, camera functions, application downloading functions, and the like) entirely when the device is determined to be in one or more particular locations (e.g., in an office location, warehouse location, or any other restricted location of the organization).

If it is determined in step 206 that the message does not violate one or more policies, then in step 207, the message may be allowed to be sent. For example, if the mobile computing device (and/or the communication monitoring software being executed thereon) determines, in step 206, that the message does not violate any policies, then in step 207, the mobile computing device (and/or the communication monitoring software being executed thereon) might not take any further action with respect to the message and/or might continue background monitoring to enable detection of future requests to send other messages.

On the other hand, if it is determined in step 206 that the message violates one or more policies, then in step 208, the message may be flagged. For example, if the mobile computing device (and/or the communication monitoring software being executed thereon) determines in step 206 that the message violates one or more policies, then in step 208, the mobile computing device (and/or the communication monitoring software being executed thereon) may add the message to a listing of messages flagged as violating the one or more policies and/or may record additional information about the message, such as the message body (e.g., the text, picture, video, sound, and/or other data making up the content of the message), the intended recipient(s) of the message, the time at which the user attempted to send the message, and/or other information related to the message. According to one or more aspects, this listing of messages may represent a locally stored message log in which the mobile computing device stores flagged messages until, for instance, the mobile computing device is able to transmit and/or transfer information about the flagged messages included in the locally stored message log to an administrative server (e.g., for central logging of such messages by the administrative server).

Subsequently, in step 209, the message may be prevented from being sent. For example, in step 209, the mobile computing device (and/or the communication monitoring software being executed thereon) may use one or more functions provided by one or more APIs to stop and/or otherwise prohibit the messaging application and/or the mobile device from sending the message.

In step 210, an alert window may be displayed. For example, in step 210, the mobile computing device (and/or the communication monitoring software being executed thereon) may display an alert window and/or other user interface to notify the user that the message was prevented from being sent and/or has been flagged and/or logged.

FIG. 4 illustrates an example user interface that includes an example alert window 400 that may be displayed (e.g., by the mobile computing device (and/or the communication monitoring software being executed thereon)) in step 210. As seen in FIG. 4, alert window 400 may inform a user that a message, which was requested to be sent by the user, cannot be sent and/or that the message includes content that cannot be sent without violating one or more usage policies.

FIG. 5 illustrates another example user interface that includes an example alert window 500 that also may be displayed (e.g., by the mobile computing device (and/or the communication monitoring software being executed thereon)) in step 210. In particular, alert window 500 may be displayed in instances where the mobile computing device is in an area (e.g., as determined using one or more geo-location functionalities of the mobile computing device) in which messaging is limited by one or more geographical usage policies. For instance, as seen in FIG. 5, alert window 500 may inform a user that a message, which was requested to be sent by the user, cannot be sent because the mobile computing device is in a restricted area and/or because the message includes particular content which is prohibited from being sent while the mobile computing device is in the restricted area (e.g., as defined by one or more usage policies).

Referring again to FIG. 2, in step 211, a notification message may be sent to an administrative server. For example, in step 211, the mobile computing device (and/or the communication monitoring software being executed thereon) may send a message to an administrative server to notify the administrative server that the message has been prevented from being sent because it was determined to violate one or more policies. In one or more arrangements, in sending such a notification message to the administrative server, the mobile computing device (and/or the communication monitoring software being executed thereon) also may send the information related to the message that was logged (e.g., the message body, intended recipient(s), timestamp, and the like) to the administrative server. Additionally or alternatively, the mobile computing device (and/or the communication monitoring software being executed thereon) may send a copy of the message itself to the administrative server (e.g., to enable the administrative server to log the copy of the message in one or more data tables and/or databases maintained by the administrative server). In some arrangements, representatives of the organization, such as internal compliance officers, may subsequently consult the data tables and/or databases stored on the administrative server in periodically reviewing logged and/or flagged messages for legal and/or regulatory compliance purposes.

Subsequently, the mobile computing device (and/or the communication monitoring software being executed thereon) might continue background monitoring to enable detection of future requests to send other messages and/or the method may end.

Having described an example method of monitoring communications, an example method of monitoring and/or managing other aspects of a mobile device, such as the applications installed thereon, will now be described.

Figure 6:
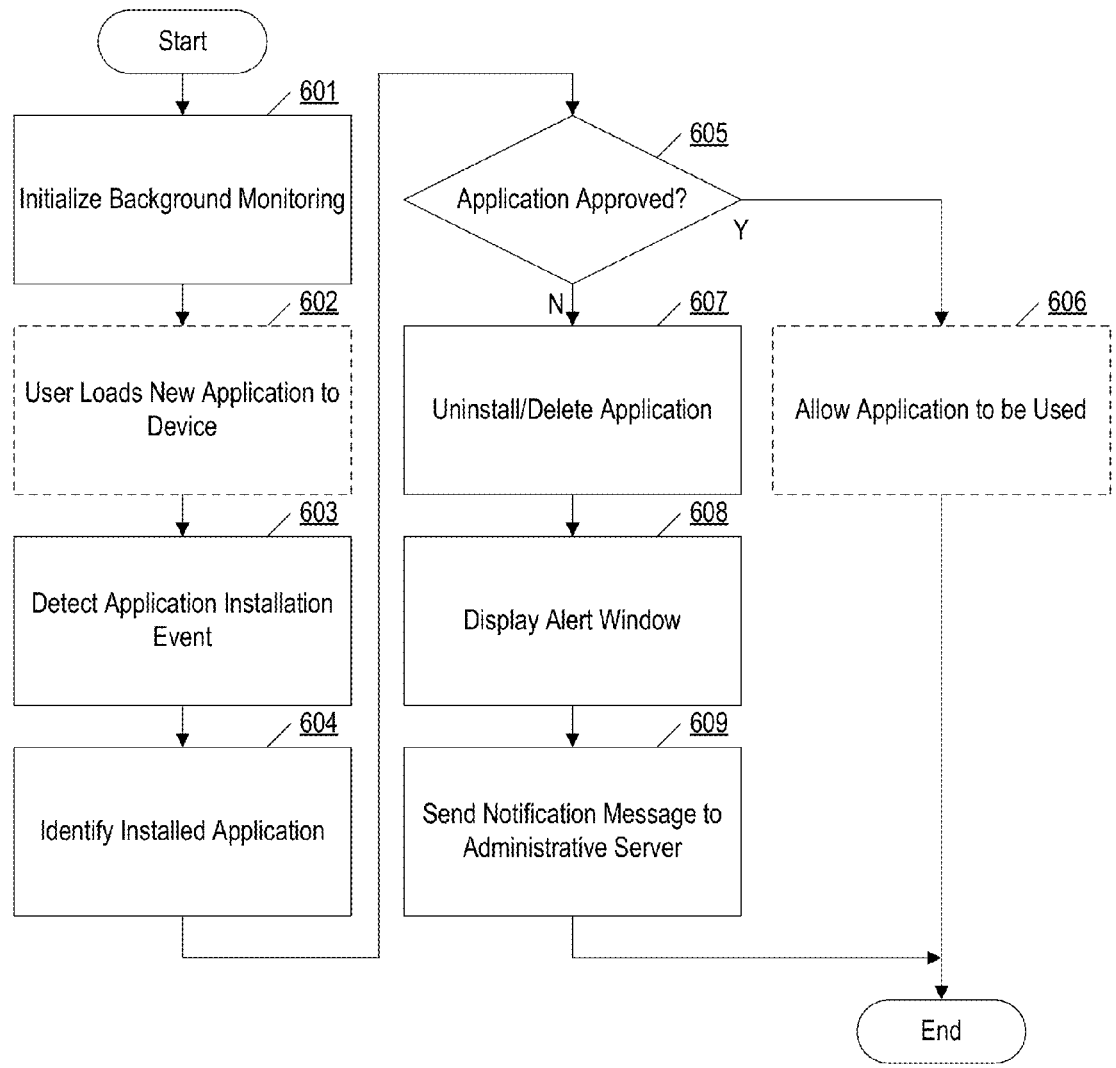
FIG. 6 illustrates an example method of managing one or more mobile devices according to one or more illustrative aspects described herein.

FIG. 6 illustrates an example method of managing one or more mobile devices according to one or more illustrative aspects described herein. In step 601, background monitoring may be initialized. For example, in step 601, a computing device (e.g., a mobile computing device, such as a smartphone, tablet computer, and the like) may initialize and/or otherwise execute one or more background monitoring processes, similar to how such background monitoring processes could be initialized and/or executed in step 201 above.

According to one or more aspects, the one or more background monitoring processes may, in this instance, form part of a device monitoring software application, which in some arrangements, may be the same as, different from, or incorporated into the communication monitoring software application described above. The device monitoring software application may, for example, be deployed by an organization (e.g., a financial institution) to one or more computing device (e.g., smartphones, tablet computers, and the like) which the organization provides to its employees, contractors, affiliates, and/or any other entities. Similar to the communication monitoring software application described above, the one or more background monitoring processes (e.g., of the device monitoring software application) may monitor events occurring on the mobile computing device by listening to an event console provided by the operating system of the mobile computing device, and such an event console may include real-time status updates from any and/or all of the one or more various software applications that may be running on the mobile computing device.

In step 602, a user may load a new application onto the computing device. For example, the user may download a new software application onto the computing device, for instance, via a wireless network connection of the mobile computing device, such as an IEEE 802.11b/g/a/n connection or via a cellular connection. In another example, the user may download a new software application onto the computing device via a wired connection of the mobile computing device, such as a Universal Serial Bus (USB) connection (e.g., by connecting the mobile computing device to another computing device using a USB cable). Advantageously, whether the user loads the new application onto the computing device via a wireless connection or via a wired connection, the loading of the new application may still be detected by the device monitoring software application, as further described below, because the device monitoring software application may be executed on the client-side (e.g., on the computing device itself) rather than on the server side (e.g., on a remote device administration server which might not, for instance, detect an application loaded by a wired connection).

In step 603, an application installation event may be detected. For example, in step 603, the mobile computing device (and/or the device monitoring software application) may determine that the new application has been loaded and/or installed onto the mobile computing device. In one or more arrangements, the mobile computing device (and/or the device monitoring software application) may make such a determination based on detecting, e.g., in the event console provided by the operating system of the mobile computing device, that an application installation event has been announced and/or otherwise posted to the event console. In at least one arrangement, the mobile computing device (and/or the device monitoring software application) may use one or more functions provided by one or more APIs associated with the operating system to listen to the event console and/or detect the occurrence of the application installation event in the event console. In some instances, such an application installation event may occur when an application that is already installed on the mobile computing device is, for instance, updated to a newer and/or otherwise different version.

In step 604, the installed application may be identified. For example, in step 604, the mobile computing device (and/or the device monitoring software application) may identify the application that was installed (e.g., the application which corresponded to the detected application installation event). In one or more arrangements, identifying the application may include acquiring the application's title, the application's version number, the application's release date, the name of the vendor which distributes the application, the name of the developer which developed the application, the uniform resource locator (URL) from which the application was downloaded, the application's file name, and/or the like. This information may, for instance, be acquired by the mobile computing device (and/or the device monitoring software application) from metadata included in one or more data files associated with the application and/or from information about the application stored by the operating system of the mobile computing device.

In step 605, it may be determined whether the application is approved for use. For example, in step 605, the mobile computing device (and/or the device monitoring software application) may determine whether the application is approved for use on the mobile computing device by comparing information about the application (e.g., the information identified and/or acquired in step 604) to information about one or more approved applications. As noted above, such information may include the application's title, the application's version number, the application's release date, the name of the vendor which distributes the application, the name of the developer which developed the application, the uniform resource locator (URL) from which the application was downloaded, the application's file name, and/or the like, and any and/or all of this information may be used in determining whether the application is approved for use on the mobile computing device.

In one or more arrangements, the information about one or more approved applications may be stored in a listing that includes data about applications approved by the organization for use on mobile computing devices provided by and/or managed by the organization. In at least one arrangement, such a listing may be stored locally on the mobile computing device (e.g., as a data table stored in memory of the mobile computing device). Additionally or alternatively, the listing may be updated regularly (e.g., according to a predetermined schedule, such as daily, weekly, monthly, and the like) and/or when the mobile computing device is connected to one or more networks (e.g., the Internet) so as to match a remotely stored version of the listing, which may, for instance, be maintained by the organization on an administrative server.

Figures 7, 8:
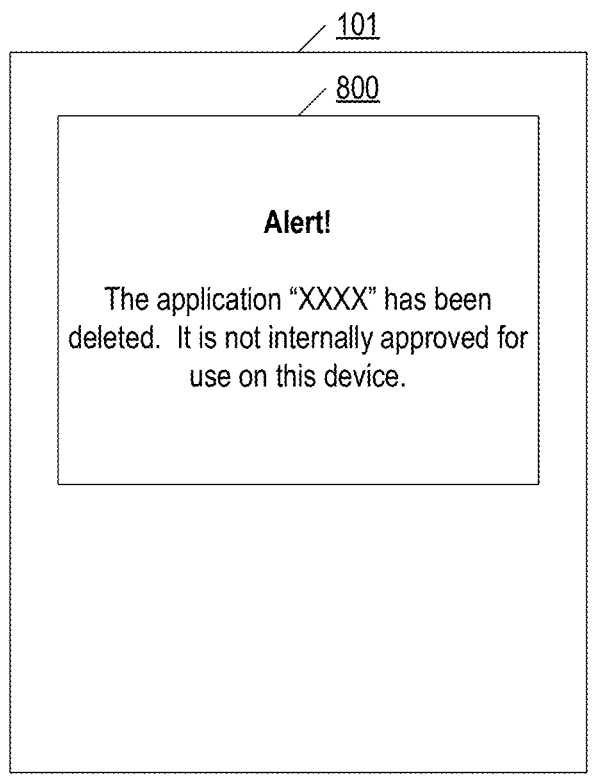
FIG. 7 illustrates an example listing of one or more approved applications according to one or more illustrative aspects described herein.
FIG. 8 illustrates an example user interface that may be displayed in managing one or more mobile devices according to one or more illustrative aspects described herein.

FIG. 7 illustrates an example listing of one or more approved applications according to one or more illustrative aspects described herein. As seen in FIG. 7, a listing of approved applications 700 may include the names and/or version numbers of one or more applications that have been approved for use, for instance, by the organization, on one or more mobile computing devices. Additionally or alternatively, for some applications, only specific version numbers (e.g., "version 1.0") of the application might be approved for use, while for other applications, a range of versions numbers (e.g., "version 2.4 and below") of the application might be approved for use. While listing 700 of FIG. 7 is illustrated as an example, an organization, such as a financial institution, may be able to customize the specificity of information included in such a listing of approved applications to any degree desired, and any listing of greater and/or less specificity is within the scope of this disclosure.

Referring again to FIG. 6, if it is determined in step 605 that the application is approved for use, then in step 606, the computing device may allow the application to be used. For example, if the mobile computing device (and/or the device monitoring software application) determines, in step 605, that the application matches an entry in the listing of approved applications, then in step 606, the mobile computing device (and/or the device monitoring software application) might not take any further action with respect to the application and/or might continue background monitoring to enable detection of future application installation events.

On the other hand, if it is determined in step 605 that the application is not approved for use, then in step 607, the computing device may uninstall and/or delete the application. For example, if the mobile computing device (and/or the device monitoring software application) determines, in step 605, that the application does not match an entry in the listing of approved applications, then in step 607, the mobile computing device (and/or the device monitoring software application) may uninstall and/or delete the application (e.g., from the memory of the mobile computing device).

Subsequently, in step 608, an alert window may be displayed. For example, in step 608, the mobile computing device (and/or the device monitoring software application) may display an alert window and/or other user interface to notify the user that the application has been uninstalled and/or deleted. Additionally or alternatively, such an alert window and/or other user interface may notify the user that the attempted installation of the application has been flagged and/or logged.

FIG. 8 illustrates an example user interface that includes an example alert window 800 that may be displayed (e.g., by the mobile computing device (and/or the device monitoring software application)) in step 608. As seen in FIG. 8, alert window 800 may inform a user that an application has been deleted and/or that the application is not approved for use on the computing device.

Referring again to FIG. 6, in step 609, a notification message may be sent to an administrative server. For example, in step 609, the mobile computing device (and/or the device monitoring software application) may send a message to an administrative server to notify the administrative server that an application has been deleted from the mobile computing device because it was determined that the application was not approved for use on the mobile computing device, similar to how such a notification message may be sent in step 211 above.

According to one or more aspects, in sending such a notification message to the administrative server, the mobile computing device (and/or the device monitoring software application) also may send information about the application that was deleted to the administrative server, such as the name of the application, the version number of the application, the URL from which the application was downloaded, and/or any other information about the application that may be available, such as the information about the application described above. Additionally or alternatively, the mobile computing device (and/or the device monitoring software application) may send a copy of the application to the administrative server (e.g., to enable the administrative server and/or one or more representatives of the organization, such as internal compliance officers and/or network security offers, to examine the application and determine whether any further recourse is required, such as whether to impose disciplinary sanctions on the associate who attempted to install the application and/or whether additional security measures need to be taken in order to prevent and/or mitigate potential harm caused by the application to the organization's other devices and networks).

Subsequently, the mobile computing device (and/or the device monitoring software application) might continue background monitoring to enable detection of future application installation events and/or the method may end.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable medium. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus, comprising:
   at least one processor; and
   memory storing computer-readable instructions that, when executed by the at least one processor, cause the apparatus to:
   detect a user command to send an electronic message using the apparatus;
   determine a current location of the apparatus;
   analyze content of the electronic message to determine whether the message violates one or more policies;
   determine that the message violates the one or more policies if the current location of the apparatus is at least one restricted location and the content of the electronic message includes particular content which is prohibited from being sent from the at least one restricted location;
   in response to determining that the message violates the one or more policies, add the message to a listing of flagged messages; and
   in response to determining that the message violates the one or more policies, prevent the message from being sent,
   wherein at least one policy of the one or more policies prevents messages that include particular words, phrases, or patterns from being sent from the at least one restricted location, the at least one policy identifying the particular words, phrases, or patterns to be blocked while the apparatus is in the at least one restricted location,
   wherein the particular words, phrases, or patterns are selected for inclusion in a listing of prohibited words, phrases, and patterns based on one or more insider trading laws and securities regulations, and
   wherein the at least one restricted location is a location designated by an organization implementing the at least one policy as including confidential information.

2. The apparatus of claim 1, wherein analyzing content of the electronic message includes:
   comparing the content of the electronic message with a blacklist to determine whether the content of the electronic message includes any words, phrases, or patterns included in the blacklist.

3. The apparatus of claim 2, wherein the memory stores additional computer-readable instructions that, when executed by the at least one processor, further cause the apparatus to:
   in response to determining that the content of the electronic message includes any words, phrases, or patterns included in the blacklist, determine that the message violates the one or more policies.

4. The apparatus of claim 1, wherein adding the message to the listing of flagged messages includes:
   recording a message body of the electronic message, an intended recipient of the electronic message, or a timestamp of the electronic message.

5. The apparatus of claim 1, wherein the memory stores additional computer-readable instructions that, when executed by the at least one processor, further cause the apparatus to:
   in response to determining that the message violates the one or more policies, send a notification message to an administrative server.

6. A method, comprising:
   detecting, by a mobile computing device, a user command to send an electronic message using the mobile computing device;
   determining, by the mobile computing device, a current location of the mobile computing device;
   analyzing, by the mobile computing device, content of the electronic message to determine whether the message violates one or more policies;
   determining, by the mobile computing device, that the message violates the one or more policies if the current location of the mobile computing device is at least one restricted location and the content of the electronic message includes particular content which is prohibited from being sent from the at least one restricted location;
   in response to determining that the message violates the one or more policies, adding, by the mobile computing device, the message to a listing of flagged messages; and
   in response to determining that the message violates the one or more policies, preventing, by the mobile computing device, the message from being sent,
   wherein at least one policy of the one or more policies prevents messages that include particular words, phrases, or patterns from being sent from the at least one restricted location, the at least one policy identifying the particular words, phrases, or patterns to be blocked while the mobile computing device is in the at least one restricted location,
   wherein the particular words, phrases, or patterns are selected for inclusion in a listing of prohibited words, phrases, and patterns based on one or more insider trading laws and securities regulations, and
   wherein the at least one restricted location is a location designated by an organization implementing the at least one policy as including confidential information.

7. The method of claim 6, wherein analyzing content of the electronic message includes:
   comparing the content of the electronic message with a blacklist to determine whether the content of the electronic message includes any words, phrases, or patterns included in the blacklist.

8. The method of claim 6, wherein adding the message to the listing of flagged messages includes:
   recording a message body of the electronic message, an intended recipient of the electronic message, or a timestamp of the electronic message.

9. The method of claim 6, further comprising:
   in response to determining that the message violates the one or more policies, sending, by the mobile computing device, a notification message to an administrative server.

10. The method of claim 6, wherein the at least one policy of the one or more policies further prevents messages that include picture content from being sent from the at least one restricted location.

11. The method of claim 6, wherein the at least one policy of the one or more policies further prevents messages that include video content from being sent from the at least one restricted location.

12. The method of claim 6, wherein the location designated by the organization is an office location of the organization.

13. The method of claim 6, wherein the user command to send the electronic message using the mobile computing device is detected in an event console of the mobile computing device by a background monitoring process executed on the mobile computing device.

14. The method of claim 7, wherein the blacklist is stored locally on the mobile computing device, and the blacklist is updated to match a remotely stored blacklist maintained by the organization on an administrative server when the mobile computing device is connected to one or more networks.

15. The method of claim 9, wherein the notification message includes information identifying a message body of the electronic message, one or more intended recipients of the electronic message, and a timestamp of the electronic message.

16. At least one non-transitory computer-readable medium having computer-executable instructions stored thereon that, when executed by at least one processor of a mobile computing device, cause the mobile computing device to:

detect a user command to send an electronic message using the mobile computing device;

determine a current location of the mobile computing device;

analyze content of the electronic message to determine whether the message violates one or more policies;

determine that the message violates the one or more policies if the current location of the mobile computing device is at least one restricted location and the content of the electronic message includes particular content which is prohibited from being sent from the at least one restricted location;

in response to determining that the message violates the one or more policies, add the message to a listing of flagged messages; and in response to determining that the message violates the one or more policies, prevent the message from being sent, wherein at least one policy of the one or more policies prevents messages that include particular words, phrases, or patterns from being sent from the at least one restricted location, the at least one policy identifying the particular words, phrases, or patterns to be blocked while the mobile computing device is in the at least one restricted location, wherein the particular words, phrases, or patterns are selected for inclusion in a listing of prohibited words, phrases, and patterns based on one or more insider trading laws and securities regulations, and wherein the at least one restricted location is a location designated by an organization implementing the at least one policy as including confidential information.

17. The at least one non-transitory computer-readable medium of claim 16, wherein analyzing content of the electronic message includes:

comparing the content of the electronic message with a blacklist to determine whether the content of the electronic message includes any words, phrases, or patterns included in the blacklist.

18. The at least one non-transitory computer-readable medium of claim 16, wherein adding the message to the listing of flagged messages includes:

recording a message body of the electronic message, an intended recipient of the electronic message, or a timestamp of the electronic message.

19. The at least one non-transitory computer-readable medium of claim 16, having additional computer-executable instructions stored thereon that, when executed by the at least one processor of the mobile computing device, further cause the mobile computing device to:

in response to determining that the message violates the one or more policies, send a notification message to an administrative server.

\* \* \* \* \*